(12) United States Patent
Yang (10) Patent No.: US 9,200,656 B2
(45) Date of Patent: Dec. 1, 2015

(54) JOINT STRUCTURE FOR FURNITURE

(75) Inventor: Lei Yang, City of Industry, CA (US)

(73) Assignee: FURNITURE OF AMERICA, INC., City of Industry, CA (US)

(*) Notice: Subject to any disclaimer, the term of this patent is extended or adjusted under 35 U.S.C. 154(b) by 902 days.

(21) Appl. No.: 13/136,049

(22) Filed: Jul. 20, 2011

(65) Prior Publication Data

US 2013/0022394 A1    Jan. 24, 2013

(51) Int. Cl.
*F16B 12/14* (2006.01)
*F16B 12/10* (2006.01)

(52) U.S. Cl.
CPC .................. *F16B 12/10* (2013.01); *F16B 12/14* (2013.01); *Y10T 403/70* (2015.01); *Y10T 403/7022* (2015.01); *Y10T 403/7075* (2015.01)

(58) Field of Classification Search
CPC .......... F16B 12/00; F16B 12/10; F16B 12/12; F16B 12/14; F16B 12/18; F16B 12/24; F16B 12/28; F16B 12/30; F16B 12/36; F16B 12/2063
USPC ........... 403/13, 231, 263, 355–357, 373, 376, 403/377, 382, 403, DIG. 11–DIG. 13
See application file for complete search history.

(56) References Cited

U.S. PATENT DOCUMENTS

| 3,192,981 | A | * | 7/1965 | Le Roy Oliver | 411/176 |
| 3,192,982 | A | * | 7/1965 | Rohe et al. | 411/104 |
| 3,835,610 | A | * | 9/1974 | Harper et al. | 403/231 |
| 5,480,117 | A | * | 1/1996 | Fleming, III | 403/DIG. 12 |
| 5,645,270 | A | * | 7/1997 | Lawrence | 403/291 |
| 2008/0159806 | A1 | * | 7/2008 | Niswonger | 403/231 |

* cited by examiner

*Primary Examiner* — Josh Skroupa
(74) *Attorney, Agent, or Firm* — Raymond Y. Chan; David and Raymond Patent Firm (57) ABSTRACT

A furniture includes a first connecting member, a second connecting member and a joint structure. The first connecting member has a distal end portion, a proximate end portion and a securing surface formed on the proximate end portion. The second connecting member has a coupling surface and a connecting slot formed on the coupling surface, wherein the connecting slot has a size which is substantially the same as that of the proximate end portion of the first connecting member. The joint structure is provided on the first connecting member and the second connecting member, in such a manner that when the proximate end portion of the first connecting member is inserted into the connecting slot of the second connecting member for substantially withstanding a load applied on the distal end portion of the first connecting member.

16 Claims, 6 Drawing Sheets

JOINT STRUCTURE FOR FURNITURE

BACKGROUND OF THE PRESENT INVENTION

1. Field of Invention

The present invention relates to furniture, and more particularly to a joint structure for furniture which is capable of detachably interlocking two pieces of connecting members in very secure manner for supporting both proximate and distal applying loads on the furniture.

2. Description of Related Arts

Conventional furniture usually comprise a plurality of furniture members such as wooden panels or beams, in which two or more panels or beams are connected with each other and interlocked by conventional interlocking devices. This enables easy assembling or disassembling of the entire furniture piece for transportation or storage purpose.

Figure 1A:
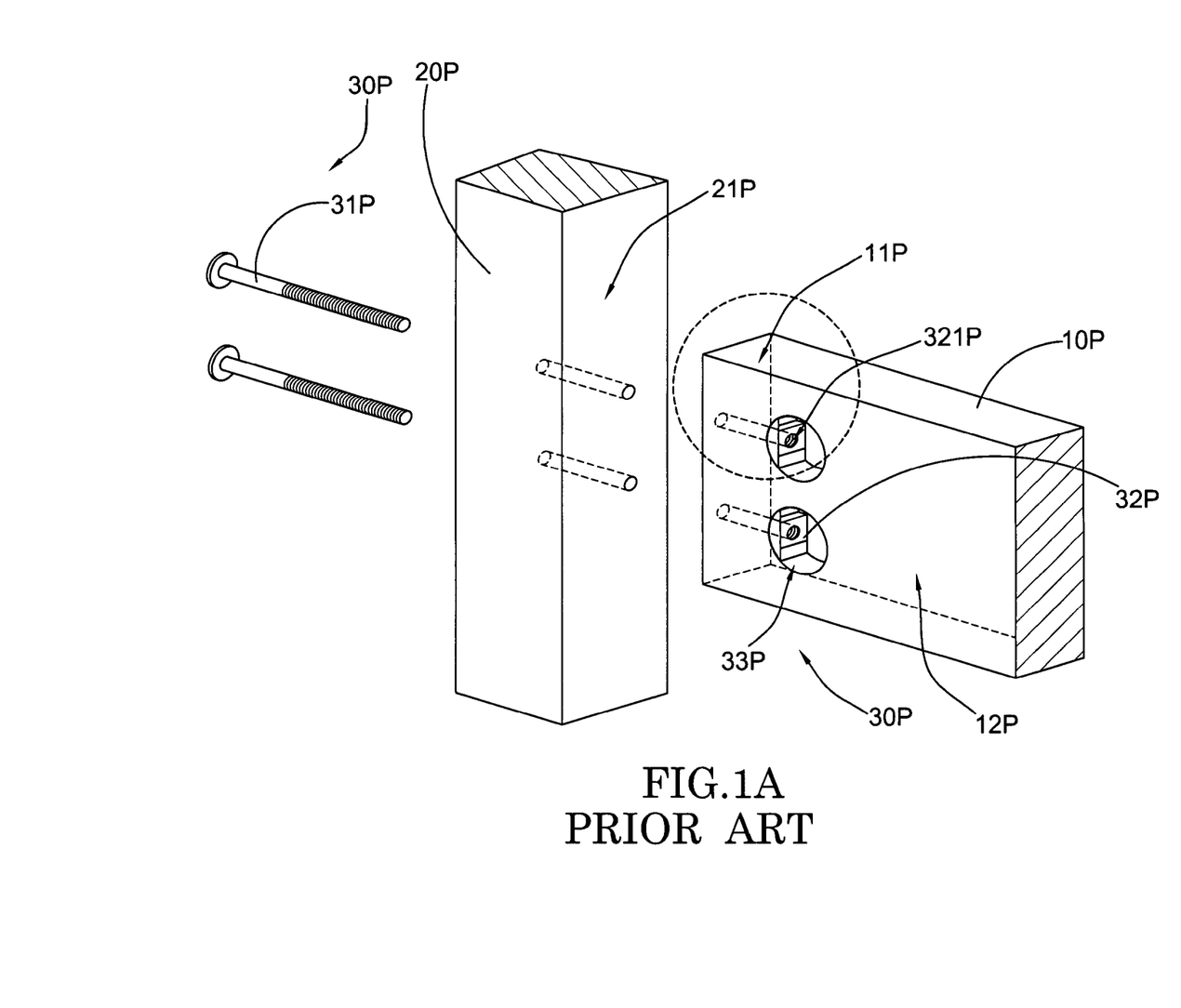
FIG. 1A and FIG. 1B are conventional interlocking devices for furniture.
Figure 1B:
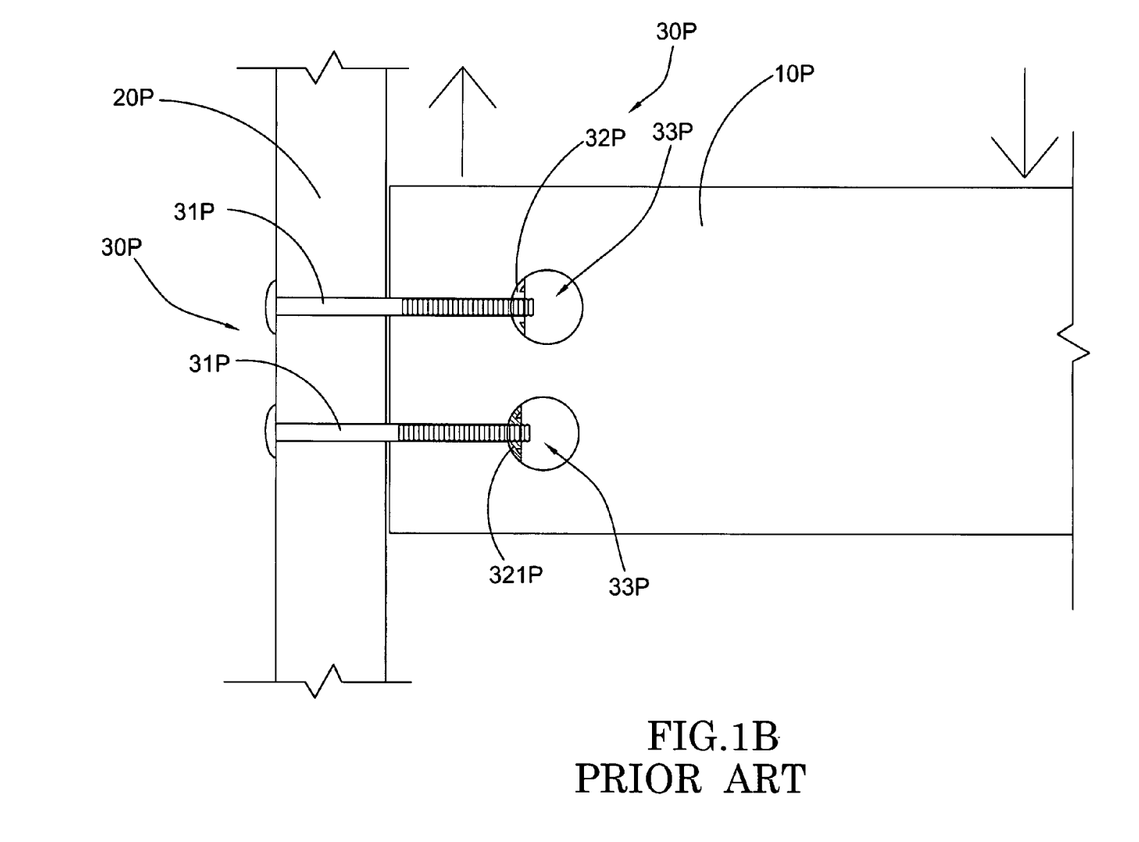

As shown in FIG. 1A and FIG. 1B of the drawings, conventional furniture, such as a conventional bed frame, usually comprises a first frame member 10P having an end portion 11P and a side surface 12P formed thereon, a second frame member 20P having a coupling surface 21P for connecting with the end portion 11P of the first frame member 10P, and an interlocker 30P coupling the first frame member 10P with the second frame member 20P. The interlocker 30P usually comprises at least one connecting bolt 31P extended from the coupling surface 21P of the second frame member 20P, a bolt locker 32P having a interlocking slot 321P, and contains a locking hole 33P formed on the side surface 12P of the first frame member 10P, wherein the bolt locker 32P is positioned in the locking hole 33P, while the connecting bolt 31P is arranged to pass through the interlocking slot 321P. When the connecting bolt 31P is turned by a screwdriver, the connecting bolt 31P is locked up by the bolt locker 32P so that the first frame member 10P does not detach from the second frame member 20P.

There are several disadvantages in association with this conventional interlocking mechanism for furniture. First, most furniture is subject to certain amount of vibration when it is put in use. For example, a bed may be accidentally moved or subject to intermittent vibration when people sleep thereon. As time goes by, the bolt locker 32P will become loose and the connecting bolt 31P will not be securely locked so as to cause the connection between the first frame member 10P and the second frame member 20P to become loose. Moreover, all screwing connections will unscrew with time.

Second, the connection between the first frame member 10P and the second frame member 20P are solely supported by the connecting bolt 31P. Thus, the strength of the joint depends on the strength of the connecting bolt 31P. When the furniture is subject to heavy loading, such as a bed is subject to the weight of the user, the connecting bolt 31P may not be sufficiently strong to bear the corresponding loading. When the furniture is subject to vibration (as mentioned above), the connecting bolt 31P may break easily and this shortens the general life span of the furniture.

Third, when the first frame member 10P is connected to the second frame member 20P by using the conventional interlocker 30P mentioned above, there is a possibility that the first frame member 10P may be rotated with respect to the second frame member 20P. This is because the function of the interlocker 30P is merely to prevent the first frame member 20P from detaching from the second frame member 20P. It does not prevent the first frame member 20P from rotating with respect to the second frame member 20P.

Fourth, as shown in FIG. 1B of the drawings, when the first frame member 10P is connected to the second frame member 20P, a corner portion of the first frame member 10P adjacent to the interlocker 30P becomes very weak and vulnerable to excessive loads. This means when the loading to the first frame member 10P is large, the corner portion of the first frame member 10P will break very easily, especially when the loads are applied to a distal end of the first frame member 10P. In other words, conventional interlocker 30P fails to provide a firm and secure connection support between the first and the second frame member 10P, 20P.

SUMMARY OF THE PRESENT INVENTION

The invention is advantageous in that it provides a joint structure for furniture which is capable of detachably interlocking two pieces of connecting members in very secure manner and provide more supporting strength.

Another advantage of the invention is to provide a joint structure for furniture for connecting a first connecting member and a second connecting member, wherein the joint structure is capable of preventing rotation between a first connecting member and a second connecting member. Moreover, the joint structure provides support in both axial and transverse direction, and for proximal and distal end of the relevant furniture frame.

Another advantage of the invention is to provide a joint structure for furniture, wherein the joint structure is capable of providing reinforced support to a connecting shaft so as to prevent the connecting shaft from being subject to excessive loading. In other words, the present invention substantially resolves the problem of accidental breakage of the connecting shaft for conventional furniture.

Another advantage of the invention is to provide a joint structure for furniture which does not involve complicated mechanical structure so that the manufacturing cost of the present invention can be kept to the minimum.

Additional advantages and features of the invention will become apparent from the description which follows, and may be realized by means of the instrumentalities and combinations particular point out in the appended claims.

According to the present invention, the foregoing and other objects and advantages are attained by providing a furniture, comprising:

a first connecting member having a distal end portion, a proximate end portion and a biasing surface formed on the proximate end portion;

a second connecting member having a coupling surface and a connecting slot formed on the coupling surface, wherein the connecting slot has a size which is substantially the same as that of the proximate end portion of the first connecting member; and a joint structure provided on the first connecting member and the second connecting member, in such a manner that when the proximate end portion of the first connecting member is inserted into the connecting slot of the second connecting member, the joint structure is arrange to detachably lock up the first connecting member with the second connecting member so as to detachably couple the first connecting member with the second connecting member, wherein the biasing surface is arranged to bias against the second connecting member for substantially withstanding a load applied on the distal end portion of the first connecting member.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 2:
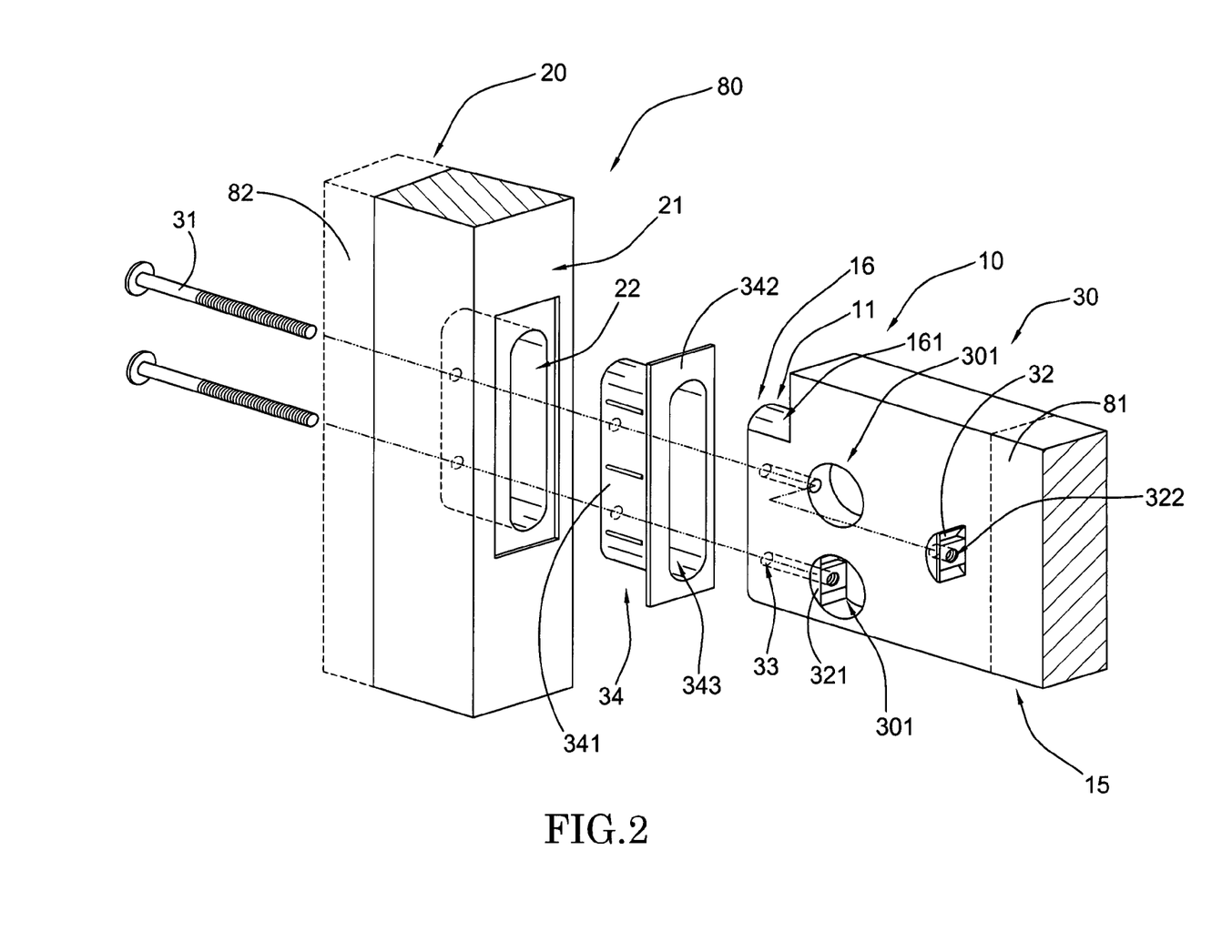
FIG. 2 is an exploded perspective view of the joint structure according to a preferred embodiment of the present invention.
Figure 3:
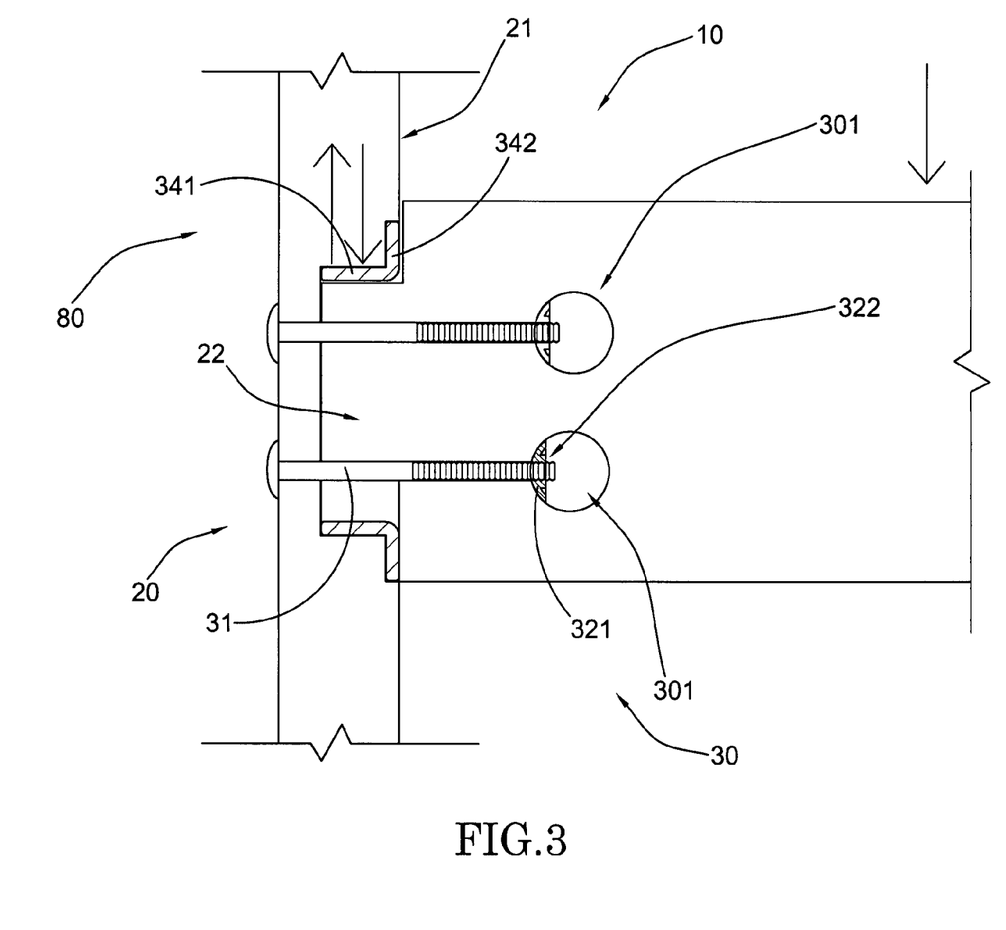
FIG. 3 is a side view of the joint structure according to the above preferred embodiment of the present invention.

Referring to FIG. 2 to FIG. 3 of the drawings, a furniture 80 according to a preferred embodiment of the present invention is illustrated, in which the furniture comprises a first connecting member 10, a second connecting member 20, and a joint structure 30.

The first connecting member 10 has a distal end portion 15, a proximate end portion 16 and a biasing surface 161 formed on the proximate end portion 16.

The second connecting member 20 has a coupling surface 21 and a connecting slot 22 formed on the coupling surface 21, wherein the connecting slot 22 has a size which slightly larger than the proximate end portion 16 of the first connecting member 10.

The joint structure 30 is provided on the first connecting member 10 and the second connecting member 20, in such a manner that when the proximate end portion 16 of the first connecting member 10 is inserted into the connecting slot 22 of the second connecting member 20, the joint structure 30 is arrange to detachably lock up the first connecting member 10 with the second connecting member 20 so as to detachably couple the first connecting member 10 with the second connecting member 20, wherein the biasing surface 161 is arranged to bias against the second connecting member 20 for substantially withstanding a load applied on the distal end portion 15 of the first connecting member 10.

The joint structure 30 is provided on the first connecting member 10 and the second connecting member 20, in such a manner that when the proximate end portion 11 of the first connecting member 10 is inserted into the connecting slot 22 of the second connecting member 20, the joint structure 30 is arrange to detachably lock up the first connecting member 10 with the second connecting member 20 so as to detachably couple the first connecting member 10 with the second connecting member 20. The load applied to the first connecting member 10 is substantially resisted by biasing surface 161 of the first connecting member 10.

The proximate end portion 11 of the first connecting member 10 has a cross sectional size smaller than that of the first connecting member 10 for inserting into the connecting slot 22 of the second connecting member 20 to define the biasing surface 161 for biasing against a corresponding surface in the connecting slot 22 (as shown in FIG. 3 of the drawings). Thus, when the proximate end portion 11 of the first connecting member 10 has been inserted into the connecting slot 22 of the second connecting member 20, the first connecting member 10 is arranged to be interlocked by the joint structure 30, and is substantially retained and is prevented from rotating with respect to the second connecting member 20. Thus, each of the proximate end portion 11 and the connecting slot 22 has a non-circular cross section so as to prevent lateral rotational movement between the first connecting member 10 and the second connecting member 20. This is in contrast with prior art because conventionally, the corner portion is extremely vulnerable to damage. In the present invention, the corner portion is substantially reinforced by the second connecting member 20 because any loading applied to the distal end portion 15 of the first connecting member 10 is supported by the corresponding inner surface of the connecting slot 22. The load is therefore uniformly distributed and resisted by the second connecting member 20.

Moreover, in order to ensure secure retention of the proximate end portion 11 within the connecting slot 22, a longitudinal length of the proximate end portion 11 is substantially equal to a depth of the connecting slot 22 so as to allow the proximate end portion 11 of the first connecting member 10 to be fittedly inserted into the second connecting member 20.

The joint structure 30 contains at least one coupling slot 301 indently formed on a side surface 12 of the first connecting member 10, and comprises at least one connecting shaft 31 extended from the connecting slot 22 of the second connecting member 20, and at least one interlocking device 32 rotatably received in the coupling slot 301, wherein the connecting shaft 31 is arranged to penetrate the proximate end portion 11 to couple with the interlocking device 32 within the coupling slot 301. Thus, the joint structure 30 further has an interlocking hole 33 longitudinally extended from a front side of the proximate end portion 11 to a side wall of the coupling slot 301 to communicate with the coupling slot 301, wherein the connecting shaft 31 is adapted to pass through the interlocking hole 33 to reach the coupling slot 301 for coupling with the interlocking device 32.

It is worth mentioning that the connecting shaft 31 is extended from an inner surface of the connecting slot 22 of the second connecting member 20 in such a manner that the proximate end portion 11 is capable of fittedly received into the connecting slot 22 while the connecting shaft 31 is extended to pass through the interlocking hole 33 formed on the first connecting member 10 for coupling with the interlocking device 32.

The interlocking device 32 comprises a main body 321 having a semi circular cross section and a through bored hole 322 formed thereon, wherein the connecting shaft 31 is arranged to pass through the bored through hole 322 for detachably connecting with the interlocking device 32. The biasing surface 161 has a radius of curvature which is substantially the same as that of the connecting slot 22 of the second connecting member 20 so as to fittedly receive the proximate end portion 16 within the connecting slot 22. Thus, the through bored hole 322 is aligned with the interlocking hole 33 when the interlocking device 32 is fittedly received in the connecting slot 22.

The joint structure 30 further comprises a securing member 34 detachably mounted on the connecting slot 22 for further restricting a lateral movement between the first connecting member 10 and the second connecting member 20. More specifically, the securing member 34 has a tubular body 341 arranged to be inserted into the connecting slot 22 for filling a space between an inner side wall of the connecting slot 22 and an outer surface of the proximate end portion 11 when it is inserted into the connecting slot 22. Moreover, the securing member 34 further has a protective sleeve 342 extended from an outer portion of the tubular body 341 and exposed out of the connecting slot 22.

It is worth mentioning that the securing member 34 is preferably made of rubber material so as to allow slight deformation thereof for preventing lateral movement between the first connecting member 10 and the second connecting member 20. The securing member 34 has a through hole 343 formed thereon for allowing the proximate end portion 11 to pass therethrough. Thus, the through hole 343 extends along the protective sleeve 342 and the tubular body 341 so as to allow the proximate end portion 11 to penetrate them.

It is important to mention that the joint structure 30 can be embodied as any other arrangement which is capable of interlocking the first connecting member 10 with the second connecting member 20.

Figure 4A:
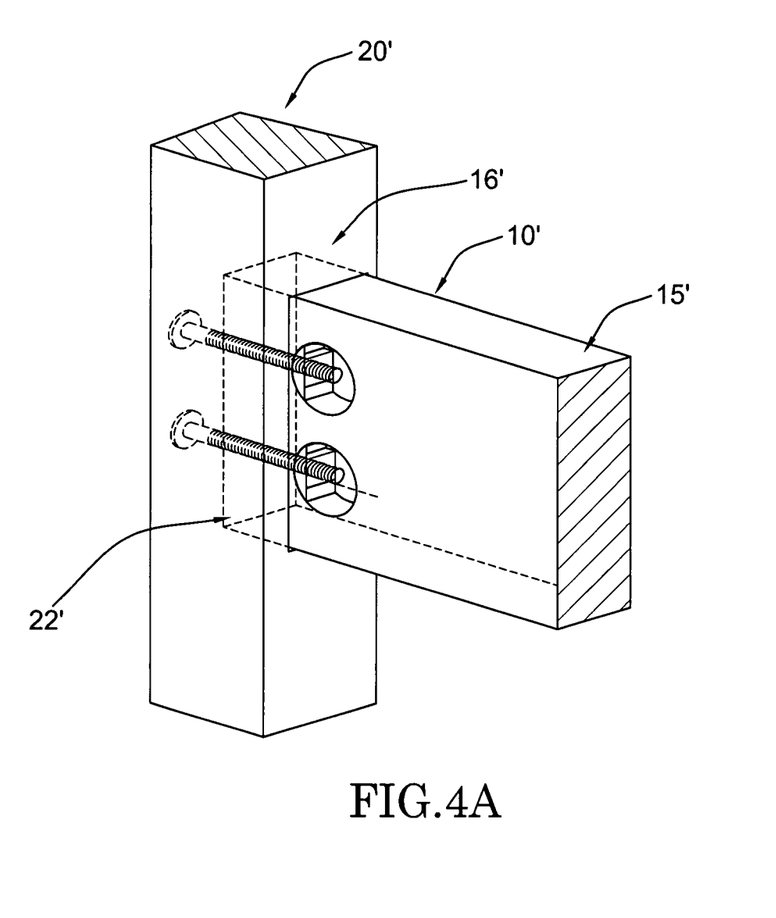
FIG. 4A and FIG. 4B are schematic diagrams of an alternative mode of the joint structure according to the above preferred embodiment of the present invention.
Figure 4B:
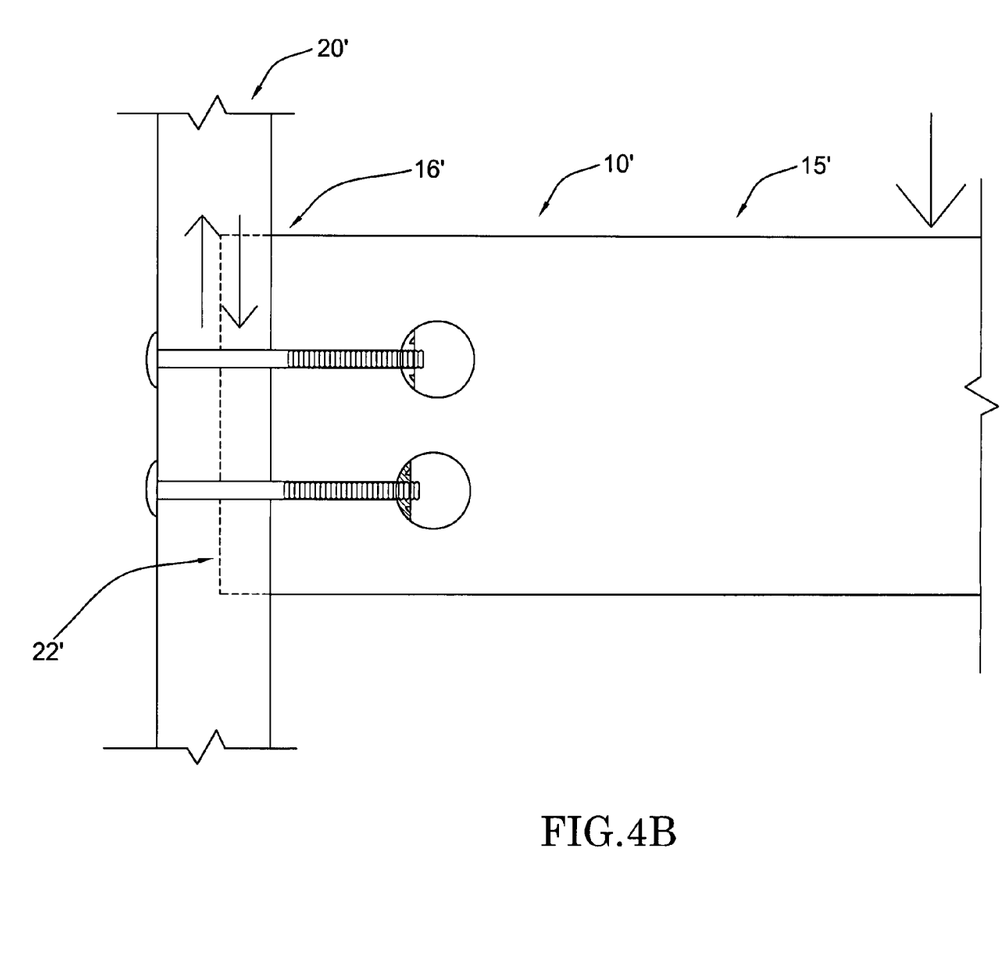

Referring to FIG. 4A and FIG. 4B of the drawings, an alternative mode of the furniture according to the above preferred embodiment of the present invention is illustrated. The alternative mode is similar to the preferred embodiment, except the first connecting member 10' has a uniform cross section, so that the proximate end portion 16' of the first connecting member 10' is arranged to be inserted into the connecting slot 22' of the second connecting member 20'. As shown in FIG. 4B of the drawings, when a load is applied to the distal end portion 15' of the first connecting member 10', the load is substantially resisted by the proximate end portion 16' of the first connecting member 10'. This is illustrated by the arrows indicated in FIG. 4B.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A furniture frame, comprising:
   a first connecting member, which is a solid furniture beam, having a solid distal end portion, a proximate end portion, a biasing surface formed on said proximate end portion, and a side surface defined on a side of said first connecting member;
   a second connecting member, which is also a solid furniture beam, having a coupling surface and a connecting slot formed on said coupling surface, wherein said proximate end portion of said first connecting member is slidably inserted into said connecting slot of said second connecting member at a position that said biasing surface of said first connecting member is biased against an inner wall of said connecting slot of said second connecting member, such that said first connecting member is perpendicularly extended from said second connecting member; and
   a joint structure which contains at least one coupling slot indently formed on said side surface of said first connecting member and at least one interlocking hole longitudinally extended from a front side of said proximate end portion to a side wall of said coupling slot to communicate with said coupling slot, wherein said joint structure further comprises at least one connecting shaft extended through said second connecting member to said connecting slot thereof, and at least one interlocking device received in said coupling slot from said side surface of said first connecting member, wherein said connecting shaft is extended from said second connecting member to slidably penetrate through said proximate end portion via said interlocking hole and to rotatably couple with said interlocking device within said coupling slot at said first connecting member, so as to detachably lock up said first connecting member with said second connecting member.

2. The furniture frame, as recited in claim 1, wherein said joint structure further comprises a deformable securing member detachably mounted on said connecting slot for further restricting a lateral movement between said first connecting member and said second connecting member, wherein said securing member has a tubular body slidably inserted into said connecting slot for filling a space between an inner side wall of said connecting slot and an outer surface of said proximate end portion when said proximate end portion is inserted into said connecting slot, and a protective sleeve extended from an outer portion of said tubular body to overlap on said coupling surface, wherein said connecting shaft is extended through said tubular body to rotatably couple with said interlocking device within said coupling slot at said first connecting member.

3. The furniture frame, as recited in claim 2, wherein said interlocking device comprises a main body having a semi circular cross section and a through bored hole formed thereon, wherein said main body is disposed in said coupling slot at a position that a radius of curvature of said main body matches with that of said side wall of said coupling slot to align said through bored hole of said main body with said interlocking hole, such that said connecting shaft passes through said interlocking hole and said bored through hole for detachably connecting with said interlocking device.

4. The furniture frame, as recited in claim 3, wherein said proximate end portion of said first connecting member has a cross sectional area smaller than that of said first connecting member, wherein when said proximate end portion of said first connecting member is inserted into said connecting slot of said second connecting member, so as to bias said first connecting member against said coupling surface of said second connecting member, wherein said biasing surface has a radius of curvature which is substantially the same as that of said connecting slot of said second connecting member, wherein a longitudinal length of said proximate end portion is substantially equal to a depth of said connecting slot so as to allow said proximate end portion of said first connecting member to be fittedly coupled with said connecting slot of said second connecting member, wherein when said proximate end portion of said first connecting member is inserted into said connecting slot of said second connecting member, said protective sleeve is sandwiched between said first connecting member and said coupling surface of said second connecting member.

5. The furniture frame, as recited in claim 3, wherein said first connecting member has a uniform cross sectional area such that a cross sectional area of said proximate end portion of said first connecting member is the same as that of said first connecting member, wherein a longitudinal length of said proximate end portion is substantially equal to a depth of said connecting slot so as to allow said proximate end portion of said first connecting member to be fittedly coupled with said connecting slot of said second connecting member.

6. The furniture frame, as recited in claim 1, wherein said interlocking device comprises a main body having a semi circular cross section and a through bored hole formed thereon, wherein said main body is disposed in said coupling slot at a position that a radius of curvature of said main body matches with that of said side wall of said coupling slot to align said through bored hole of said main body with said interlocking hole, such that said connecting shaft passes through said interlocking hole and said bored through hole for detachably connecting with said interlocking device.

7. The furniture frame, as recited in claim 1, wherein said proximate end portion of said first connecting member has a cross sectional area smaller than that of said first connecting member, wherein when said proximate end portion of said first connecting member is inserted into said connecting slot of said second connecting member, so as to bias said first connecting member against said coupling surface of said second connecting member, wherein said biasing surface has a radius of curvature which is substantially the same as that of said connecting slot of said second connecting member, wherein a longitudinal length of said proximate end portion is substantially equal to a depth of said connecting slot so as to allow said proximate end portion of said first connecting member to be fittedly coupled with said connecting slot of said second connecting member.

8. The furniture frame, as recited in claim 1, wherein said first connecting member has a uniform cross sectional area such that a cross sectional area of said proximate end portion of said first connecting member is the same as that of said first connecting member, wherein a longitudinal length of said proximate end portion is substantially equal to a depth of said connecting slot so as to allow said proximate end portion of said first connecting member to be fittedly coupled with said connecting slot of said second connecting member.

9. A furniture, comprising:
a plurality of first furniture frames, wherein each of said first furniture frames is a solid furniture beam and has a solid distal end portion, a proximate end portion, a biasing surface formed on said proximate end portion, and a side surface formed on a side of said first furniture frame;
a plurality of second furniture frames, wherein each of said second furniture frames is also a solid furniture beam and has a coupling surface and a connecting slot formed on said coupling surface, wherein said proximate end portion of each of said first furniture frames is slidably inserted into said connecting slot of said second furniture frame at a position that said biasing surface of said first furniture frame is biased against an inner wall of said connecting slot of said second furniture frame, such that said first furniture frame is perpendicularly extended from said second furniture frame; and
a joint structure which contains at least one coupling slot indently formed on said side surface of each of said first furniture frames and at least one interlocking hole longitudinally extended from a front side of said proximate end portion to a side wall of said coupling slot to communicate with said coupling slot, wherein said joint structure further comprises at least one connecting shaft extended through said second furniture frame to said connecting slot thereof, and at least one interlocking device received in said coupling slot from said side surface of said first furniture frame, wherein said connecting shaft is extended from said second furniture frame to slidably penetrate through said proximate end portion via said interlocking hole and to rotatably couple with said interlocking device within said coupling slot at said first furniture frame, so as to detachably lock up said first furniture frame with said second furniture frame.

10. The furniture, as recited in claim 9, wherein said joint structure further comprises a deformable securing member detachably mounted on said connecting slot for further restricting a lateral movement between said first furniture frame and said second furniture frame, wherein said securing member has a tubular body slidably inserted into said connecting slot for filling a space between an inner side wall of said connecting slot and an outer surface of said proximate end portion when said proximate end portion is inserted into said connecting slot, and a protective sleeve extended from an outer portion of said tubular body to overlap on said coupling surface, wherein said connecting shaft is extended through said tubular body to rotatably couple with said interlocking device within said coupling slot at said first furniture frame.

11. The furniture, as recited in claim 10, wherein said interlocking device comprises a main body having a semi circular cross section and a through bored hole formed thereon, wherein said main body is disposed in said coupling slot at a position that a radius of curvature of said main body matches with that of said side wall of said coupling slot to align said through bored hole of said main body with said interlocking hole, such that said connecting shaft passes through said interlocking hole and said bored through hole for detachably connecting with said interlocking device.

12. The furniture, as recited in claim 11, wherein said proximate end portion of said first furniture frame has a cross sectional area smaller than that of said first furniture frame, wherein when said proximate end portion of said first furniture frame is inserted into said connecting slot of said second furniture frame, so as to bias said first furniture frame against said coupling surface of said second furniture frame, wherein said biasing surface has a radius of curvature which is substantially the same as that of said connecting slot of said second furniture frame, wherein a longitudinal length of said proximate end portion is substantially equal to a depth of said connecting slot so as to allow said proximate end portion of said first furniture frame to be fittedly coupled with said connecting slot of said second furniture frame, wherein when said proximate end portion of said first furniture frame is inserted into said connecting slot of said second furniture frame, said protective sleeve is sandwiched between said first furniture frame and said coupling surface of said second furniture frame.

13. The furniture, as recited in claim 11, wherein said first furniture frame has a uniform cross sectional area such that a cross sectional area of said proximate end portion of said first furniture frame is the same as that of said first furniture frame, wherein a longitudinal length of said proximate end portion is substantially equal to a depth of said connecting slot so as to allow said proximate end portion of said first furniture frame to be fittedly coupled with said connecting slot of said second furniture frame.

14. The furniture, as recited in claim 9, wherein said interlocking device comprises a main body having a semi circular cross section and a through bored hole formed thereon, wherein said main body is disposed in said coupling slot at a position that a radius of curvature of said main body matches with that of said side wall of said coupling slot to align said through bored hole of said main body with said interlocking hole, such that said connecting shaft passes through said interlocking hole and said bored through hole for detachably connecting with said interlocking device.

15. The furniture, as recited in claim 9, wherein said proximate end portion of said first furniture frame has a cross sectional area smaller than that of said first furniture frame, wherein when said proximate end portion of said first furniture frame is inserted into said connecting slot of said second furniture frame, so as to bias said first furniture frame against said coupling surface of said second furniture frame, wherein said biasing surface has a radius of curvature which is substantially the same as that of said connecting slot of said second furniture frame, wherein a longitudinal length of said proximate end portion is substantially equal to a depth of said connecting slot so as to allow said proximate end portion of said first furniture frame to be fittedly coupled with said connecting slot of said second furniture frame.

16. The furniture, as recited in claim 9, wherein said first furniture frame has a uniform cross sectional area such that a cross sectional area of said proximate end portion of said first furniture frame is the same as that of said first furniture frame, wherein a longitudinal length of said proximate end portion is substantially equal to a depth of said connecting slot so as to allow said proximate end portion of said first furniture frame to be fittedly coupled with said connecting slot of said second furniture frame.

* * * * *